(No Model.)
E. A. FOY.
COUPLING FOR LIGHTNING RODS.
No. 344,096. Patented June 22, 1886.
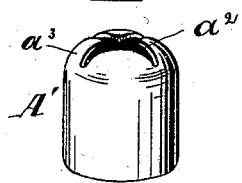
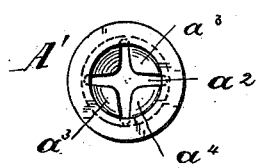
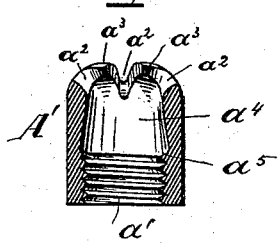
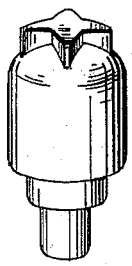
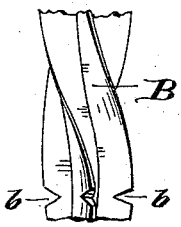
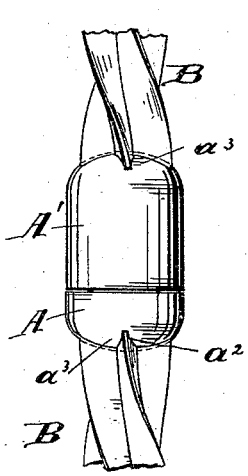
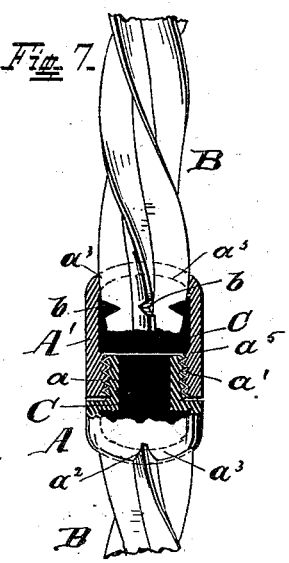
Attest
Carl Spengel
William S. Hartley
Edward A. Foy Inventor
By J. C. Harper Atty.
N. PETERS, Photo-Lithographer, Washington, D. C.

UNITED STATES PATENT OFFICE.

EDWARD A. FOY, OF CINCINNATI, OHIO.

COUPLING FOR LIGHTNING-RODS.

SPECIFICATION forming part of Letters Patent No. 344,096, dated June 22, 1886.

Application filed December 12, 1885. Serial No. 185,495. (No model.)

*To all whom it may concern:*

Be it known that I, EDWARD A. FOY, of the city of Cincinnati, county of Hamilton, and State of Ohio, have invented certain new and useful Improvements in Couplings for Lightning-Rods, of which the following is a specification.

My invention relates to that class of lightning-rods known as "star" or flanged rods; and it consists in a novel form of socket or coupling-piece, and the mode of securing it to the rod.

My coupling combines at once strength and durability with neatness and simplicity. It also makes a joint that is substantially water-tight, and secures a continuous rod and good conductor. These are all considerations of the first importance.

In the drawings, Figure 1 is a perspective view of my improved coupling-socket showing the oval end and rigid lips. Fig. 2 is an under side view of the same showing the cylindrical interior. Fig. 3 is a central longitudinal sectional view of the same with a flaring interior. Fig. 4 is a perspective view of the core upon which these coupling-sockets are molded. Fig. 5 shows the end of the rod with the flanges notched. Fig. 6 shows two sections of rod coupled together with my improved coupling. Fig. 7 is a central vertical section of the coupling shown in Fig. 6.

A A' are the coupling-sockets, having male screw $a$, female screw $a'$, respectively. The end is cast oval with apertures $a^2$ to receive the flanges of the rod, and with rigid lips $a^3$. Projections have been made which, when swaged or compressed on the rod, also have a somewhat rounded appearance; but such projections are necessarily thin, so that they may readily be pressed into their place, and hence are easily pulled out when the rod is subjected to a longitudinal or oblique strain. The lips of my improved coupling are molded, fixed, and rigid in the form in which they are to remain, and thus a greater thickness of metal is secured, and they have the strength necessary to perform the function required of them. Immediately back of these lips is molded a cylindrical recess, $a^4$, which may be made flaring toward the screw end or not, as preferred. The recess terminates in a shoulder, $a^5$, at or about where the screw begins; but the socket is hollow through to the outer end of the screw. The socket is now ready to receive the rod B, the flanges of which are notched or otherwise roughened, $b$. The rod is inserted through the apertures $a^3$, and pressed up to the shoulder $a^5$. These apertures $a^2$ are made merely large enough to admit the flanges of the rod, a close fit being secured. The rod being in place in the socket or coupling-piece, molten metal or alloy of high conductivity is poured into the hollow screw end of the socket until the cavity within the socket is entirely filled. In this way an absolutely water-tight joint is made with the rod. The molten metal attaches itself firmly to the rod by means of the notching or roughening $b$, while in filling the recess it has attained a body that, when opposed to the thick rigid lips, makes it impossible to pull or twist the rod from the coupling, added to which a perfect conductor is secured without break or hinderance at the joint by the superior conductivity of the metal filling, which presses closely together when two sections are united, making a continuous rod. In Fig. 7 this metal filling C is seen to have entered the notches $b$ in the flanges, and to have attained a body that rests against the lips $a^3$, and closes any crevices between the lips and flanges in the apertures $a^2$.

The molding of the socket upon a core similar to that shown in Fig. 4, is of much practical importance. It gives rigidity, thickness, and strength to the lips, and an ovalness and neatness of finish that can be obtained in no other way.

I claim and desire to secure by Letters Patent—

1. A coupling for lightning-rods comprising two hollow sockets provided, respectively, with a male and a female screw, with internal shoulders against which the ends of the rod abut, and with an alloy filling of high conductivity, arranged and operating substantially as described.

2. In a lightning-rod joint, the combination, with a rod having its ends notched or roughened, of the sockets having male and female screws, respectively, and provided with apertures formed with rigid lips to enter between the flanges of said rod, and recesses formed in said sockets filled with a metal or alloy of high conductivity, as and for the purpose set forth.

3. In combination with a lightning-rod having notches $b$ in its flanges, a coupling having apertures $a^2$, lips $a^3$, cylindrical recesses $a^4$, filled with metal C, and shoulder $a^5$, all constructed and arranged substantially as set forth.

EDWARD A. FOY.

Witnesses:
WILLIAM S. HARTLEY,
F. O. SAWYER.